(12) United States Patent
Jurrens

(10) Patent No.: US 11,548,345 B1
(45) Date of Patent: Jan. 10, 2023

(54) SUSPENSION COMPONENT FOR UTILITY VEHICLES

(71) Applicant: AFCO Performance Group, LLC, Boonville, IN (US)

(72) Inventor: Jesse Jurrens, Sturgis, SD (US)

(73) Assignee: AFCO Performance Group, LLC, Boonville, IN (US)

( * ) Notice: Subject to any disclaimer, the term of this patent is extended or adjusted under 35 U.S.C. 154(b) by 253 days.

(21) Appl. No.: 17/010,148

(22) Filed: Sep. 2, 2020

(51) Int. Cl.
| | |
|---|---|
| *B60G 17/08* | (2006.01) |
| *B60G 17/052* | (2006.01) |
| *B62K 25/06* | (2006.01) |

(52) U.S. Cl.
CPC ......... *B60G 17/08* (2013.01); *B60G 17/0523* (2013.01); *B60G 2202/152* (2013.01); *B62K 25/06* (2013.01)

(58) Field of Classification Search
CPC ................ B60G 17/08; B60G 17/0523; B60G 2202/152; B62K 25/06
See application file for complete search history.

(56) References Cited

U.S. PATENT DOCUMENTS

| | | | | |
|---|---|---|---|---|
| 3,391,922 A | * | 7/1968 | Axthammer | F16F 9/084 267/64.23 |
| 3,399,882 A | * | 9/1968 | Hausmann | B60G 17/048 267/64.21 |
| 3,459,441 A | | 8/1969 | Hornsby | |
| 3,486,515 A | * | 12/1969 | Chrysostomides | A61H 3/0277 135/69 |
| 3,574,352 A | | 4/1971 | Elliott | |
| 3,592,485 A | | 7/1971 | Buhl | |
| 3,603,611 A | | 9/1971 | Wenham | |
| 3,618,972 A | | 11/1971 | Buhl | |
| 3,691,336 A | | 9/1972 | Higginbotham | |
| 3,866,894 A | | 2/1975 | Sweet | |
| 3,977,697 A | | 8/1976 | Macpike | |
| 4,022,448 A | * | 5/1977 | Reeder | F16F 9/084 188/269 |

(Continued)

FOREIGN PATENT DOCUMENTS

| | | |
|---|---|---|
| AU | 2003231717 | 8/2003 |
| AU | 2012233584 | 4/2015 |

OTHER PUBLICATIONS

US 6,403,115 B2, 03/2013, Gartner (withdrawn)

*Primary Examiner* — Paul N Dickson
*Assistant Examiner* — Timothy Wilhelm
(74) *Attorney, Agent, or Firm* — Woodard, Emhardt, Henry, Reeves & Wagner, LLP

(57) ABSTRACT

A suspension component for a vehicle may include a spring section performing a support function for supporting a portion of the vehicle and a shock absorbing section performing a damping function to damp action of the spring section. The spring section may be adjustable to provide adjustable support characteristics and the shock absorbing section is adjustable to provide adjustable damping characteristics. The spring section may be adjustable independent of the shock absorbing section. The spring section of the suspension component may define a gas chamber for holding a quantity of a gas to provide a spring support for the vehicle, and the shock absorbing section of the suspension component may define a fluid chamber to provide damping of movement of the spring section.

10 Claims, 13 Drawing Sheets

(56) References Cited

U.S. PATENT DOCUMENTS

| | | | | |
|---|---|---|---|---|
| 4,183,509 | A | * | 1/1980 | Nishikawa ............... F16F 9/44 267/218 |
| 4,206,907 | A | * | 6/1980 | Harrod ................ B60G 15/14 267/64.24 |
| RE30,462 | E | | 12/1980 | Pohl |
| 4,354,693 | A | | 10/1982 | Maeda |
| 4,422,661 | A | | 12/1983 | Kawamura |
| 4,439,986 | A | | 4/1984 | Snitgen |
| 4,494,770 | A | | 1/1985 | Reynolds |
| 4,513,837 | A | | 4/1985 | Archer |
| 4,563,038 | A | | 1/1986 | Hirose |
| 4,568,101 | A | | 2/1986 | Bleustein |
| 4,588,171 | A | * | 5/1986 | Stephens ............. B62D 33/071 267/64.24 |
| 4,619,578 | A | | 10/1986 | Routledge |
| 4,688,774 | A | * | 8/1987 | Warmuth, II .......... F16F 9/084 267/35 |
| 4,709,934 | A | | 12/1987 | Suzuki |
| 4,815,758 | A | | 3/1989 | Yoshida |
| 5,069,302 | A | | 12/1991 | Kageyama |
| 5,094,325 | A | * | 3/1992 | Smith ................... F16F 13/00 188/282.1 |
| 5,098,114 | A | | 3/1992 | Jones |
| 5,348,112 | A | | 9/1994 | Vaillancourt |
| 5,403,028 | A | | 4/1995 | Trimble |
| 5,469,930 | A | | 11/1995 | Wiers |
| 5,487,443 | A | | 1/1996 | Thurm |
| 5,533,586 | A | | 7/1996 | Thompson |
| 5,664,649 | A | | 9/1997 | Thompson |
| 5,711,390 | A | | 1/1998 | Hikichi |
| 6,003,628 | A | | 12/1999 | Jurrens |
| 6,068,276 | A | | 5/2000 | Kallstrom |
| 6,095,541 | A | | 8/2000 | Turner |
| 6,116,584 | A | | 9/2000 | Romer |
| 6,193,005 | B1 | | 2/2001 | Jurrens |
| 6,286,820 | B1 | * | 9/2001 | Raulf ...................... F16F 9/05 267/64.24 |
| 6,296,092 | B1 | | 10/2001 | Marking |
| 6,357,546 | B1 | | 3/2002 | Crosby, Jr. |
| 6,374,966 | B1 | * | 4/2002 | Lillbacka ............. F16F 9/0454 188/266 |
| 6,520,524 | B1 | | 2/2003 | Costa |
| 6,641,154 | B1 | | 11/2003 | Vey |
| 6,668,960 | B1 | | 12/2003 | Parker |
| 6,845,973 | B2 | * | 1/2005 | Ferrer ...................... F16F 9/38 267/64.24 |
| 6,905,126 | B1 | * | 6/2005 | Jurrens ................. B60G 15/14 280/5.514 |
| 7,070,028 | B2 | * | 7/2006 | Reybrouck .......... F16F 9/0209 188/282.8 |
| 7,159,699 | B1 | * | 1/2007 | Tine, Jr. .................... F16F 9/56 188/282.4 |
| 7,226,045 | B2 | * | 6/2007 | Brookes ............... F16F 9/0463 267/64.27 |
| 7,959,135 | B2 | * | 6/2011 | Voelkel ..................... F16F 9/05 267/64.21 |
| 8,641,051 | B2 | * | 2/2014 | Pavuk ..................... F16F 9/049 280/124.16 |
| 8,827,292 | B2 | * | 9/2014 | Batsch ................. B60G 21/073 267/226 |
| 8,894,050 | B2 | | 11/2014 | Wootten |
| 9,145,039 | B2 | * | 9/2015 | Dehmel ................. B60G 17/08 |
| 9,206,874 | B2 | * | 12/2015 | Sugata .................... F16F 9/088 |
| 9,290,231 | B1 | * | 3/2016 | Jurrens .................. F16F 9/088 |
| 9,707,817 | B1 | | 7/2017 | Arnott |
| 9,713,945 | B1 | | 7/2017 | Arnott |
| 9,915,313 | B2 | * | 3/2018 | Coaplen ................. F16F 9/062 |
| 10,005,333 | B2 | | 6/2018 | Leonard |
| 10,053,180 | B1 | * | 8/2018 | Gesto .................... B62K 21/02 |
| 10,113,603 | B2 | * | 10/2018 | Smith .................... B60G 15/12 |
| 10,400,843 | B2 | | 9/2019 | Yoshida ................. F16F 9/585 |
| 11,098,780 | B2 | * | 8/2021 | Tanaka .................... F16J 10/02 |
| 2003/0052469 | A1 | | 3/2003 | Bell |
| 2003/0094341 | A1 | | 5/2003 | Lemieux |
| 2003/0132074 | A1 | | 7/2003 | Robbins |
| 2004/0004316 | A1 | | 1/2004 | Robertson |
| 2005/0189685 | A1 | | 9/2005 | Verriet |
| 2009/0200760 | A1 | | 8/2009 | Gartner |
| 2015/0076752 | A1 | | 3/2015 | Hennemann |
| 2015/0217617 | A1 | * | 8/2015 | Leonard ................ F16F 13/06 280/124.16 |
| 2017/0284499 | A1 | | 10/2017 | Yablon |

\* cited by examiner

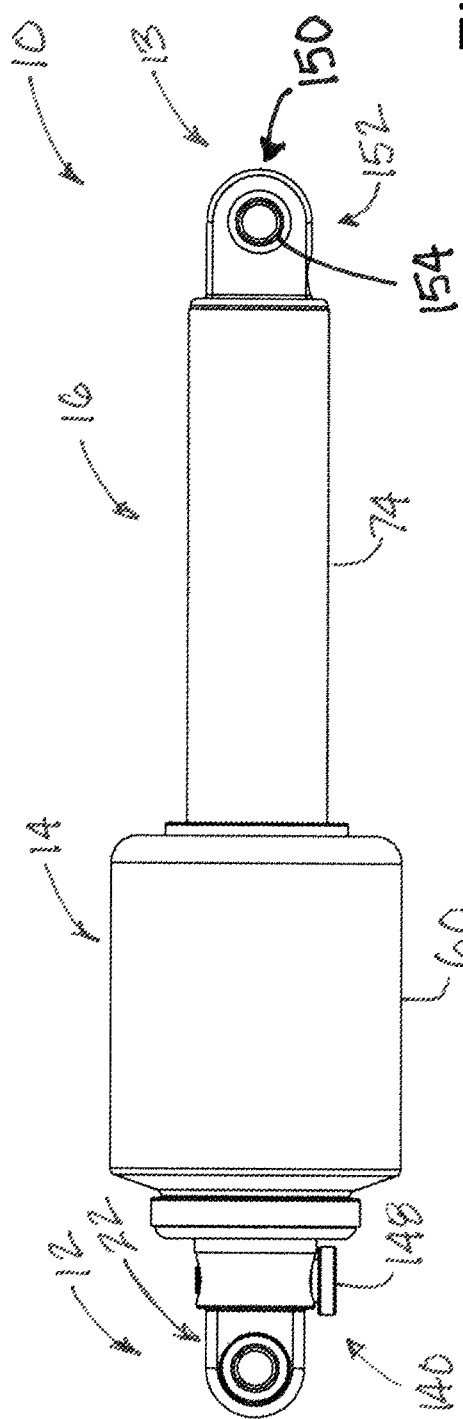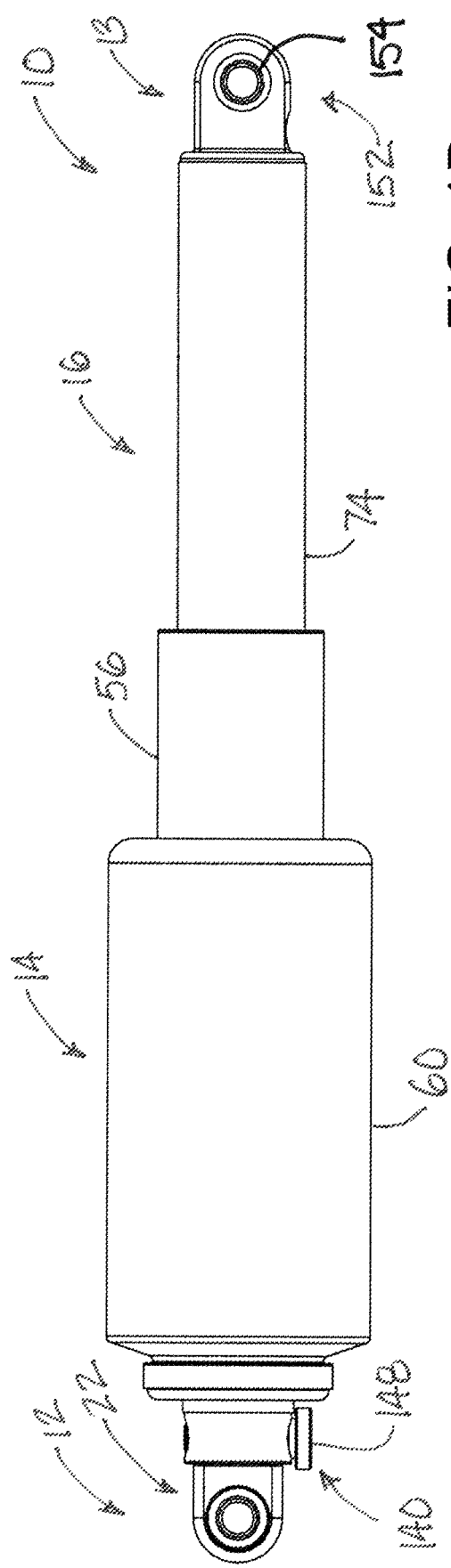

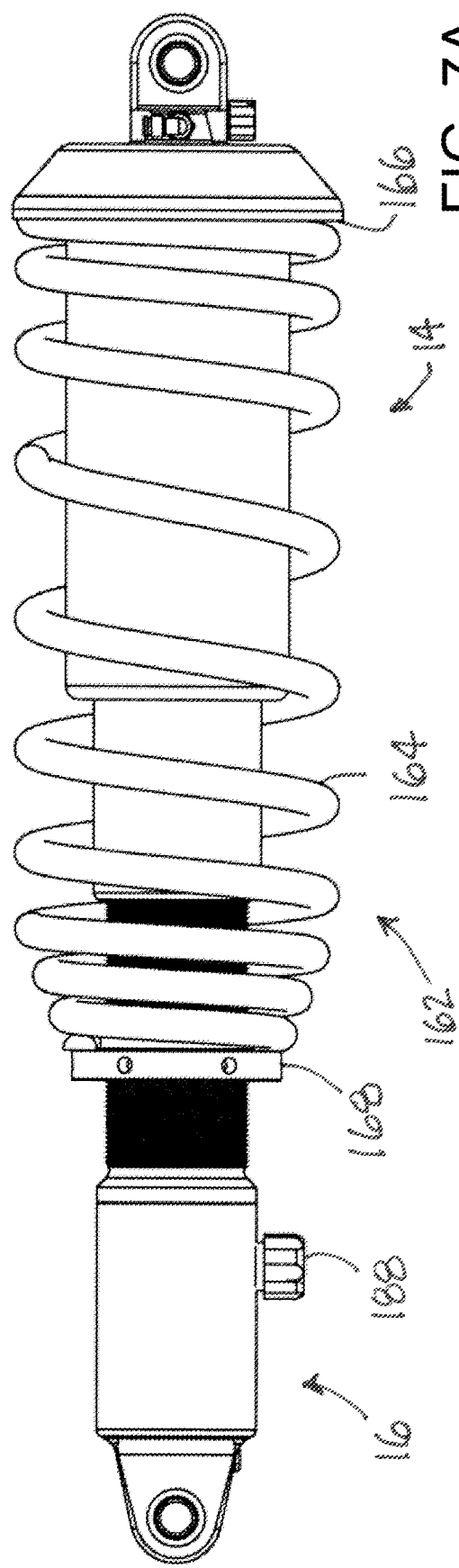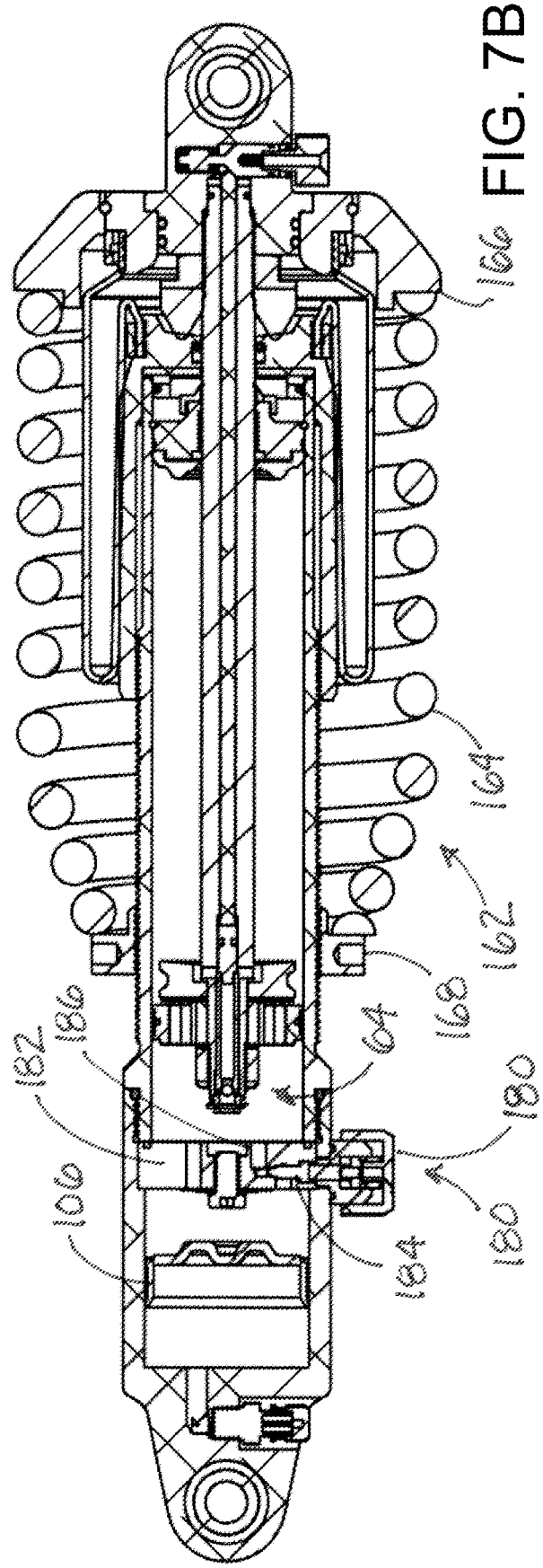

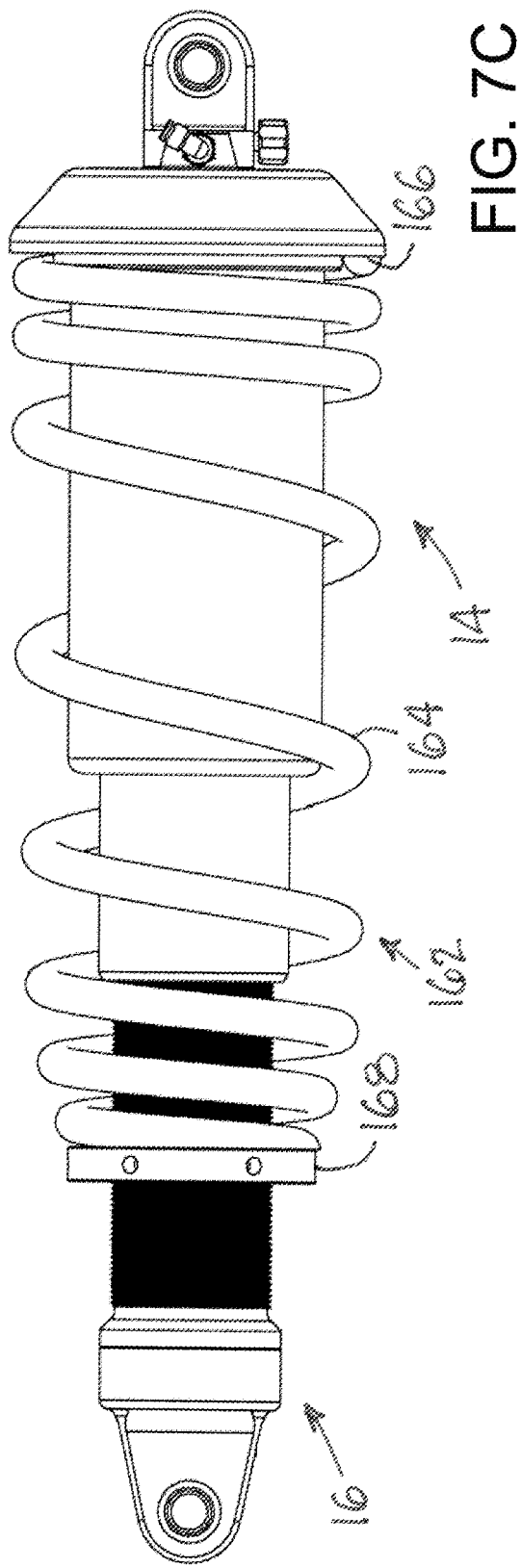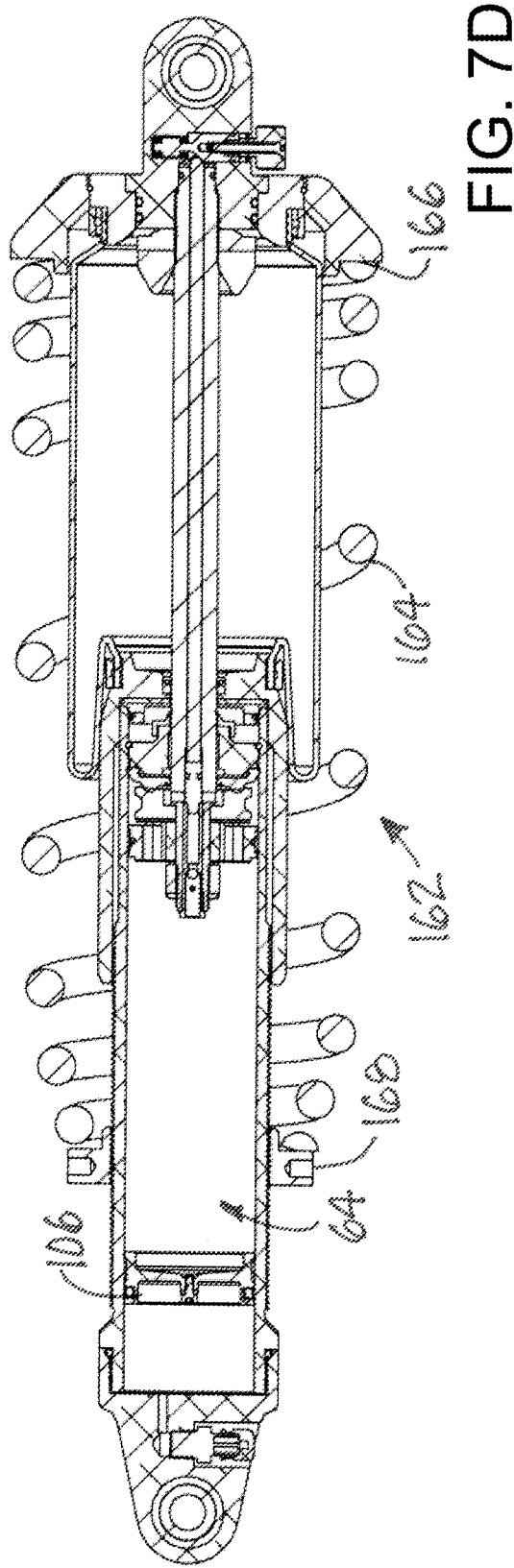

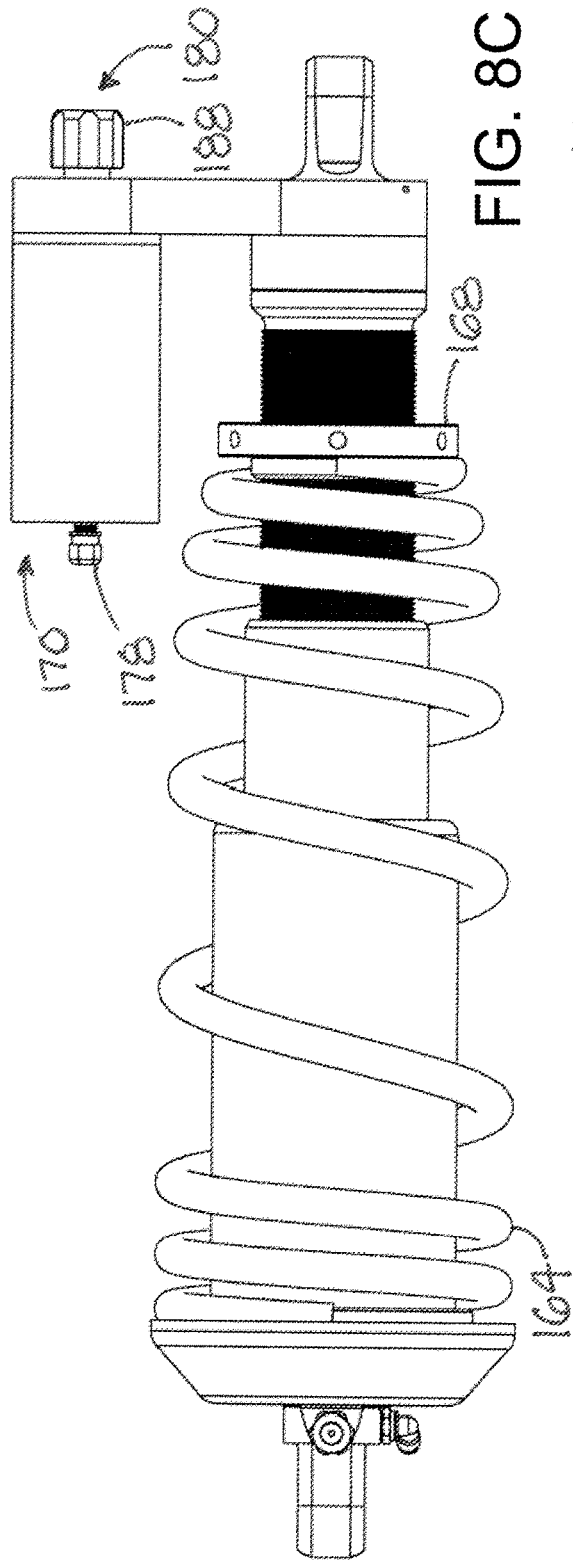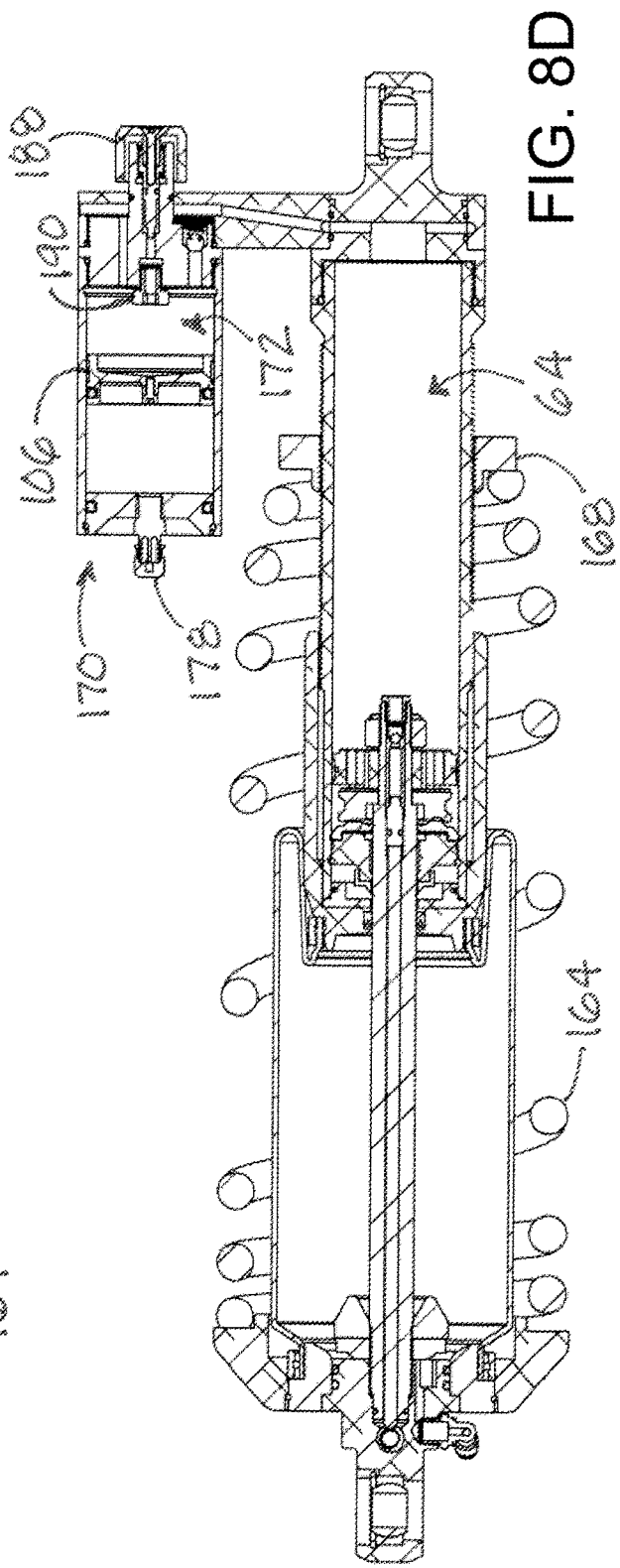

SUSPENSION COMPONENT FOR UTILITY VEHICLES

BACKGROUND

Field

The present disclosure relates to vehicle suspensions and more particularly pertains to a new suspension component for utility vehicles that enable adjustment of the suspension of the vehicle to different vehicle cargo and passenger loadings.

SUMMARY

In one aspect, the present disclosure relates to a suspension component for mounting on a frame of a vehicle and an axle of the vehicle to support the frame on the axle, with the suspension element being elongated between a first end and a second end. The component may include a spring section performing a support function for supporting a portion of the vehicle, and a shock absorbing section performing a damping function to damp action of the spring section. The spring section may be adjustable to provide adjustable support characteristics and the shock absorbing section is adjustable to provide adjustable damping characteristics, with the spring section being adjustable independent of the shock absorbing section. The spring section of the suspension component may define a gas chamber for holding a quantity of a gas to provide a spring support for the vehicle, and the shock absorbing section of the suspension component may define a fluid chamber to provide damping of movement of the spring section.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 1A is a schematic side view of a new suspension component according to the present disclosure shown in a relatively collapsed condition.

FIG. 1B is a schematic side view of the suspension component shown in a relatively extended collapsed condition.

FIG. 7A is a schematic side view of a suspension element with an optional configuration for the spring section of the suspension element.

FIG. 7B is a schematic side sectional view of the suspension element with the optional spring section configuration shown in FIG. 7A.

FIG. 7C is a schematic side view of a suspension element with another optional configuration for the spring section of the suspension element.

FIG. 7D is a schematic side sectional view of the suspension element with the optional spring section configuration shown in FIG. 7C.

FIG. 8C is a schematic side view of a suspension element with another optional configuration for the shock absorbing section of the suspension element.

FIG. 8D is a schematic side sectional view of the suspension element with the optional shock absorbing section configuration shown in FIG. 8C.

DETAILED DESCRIPTION

Figure 2A:
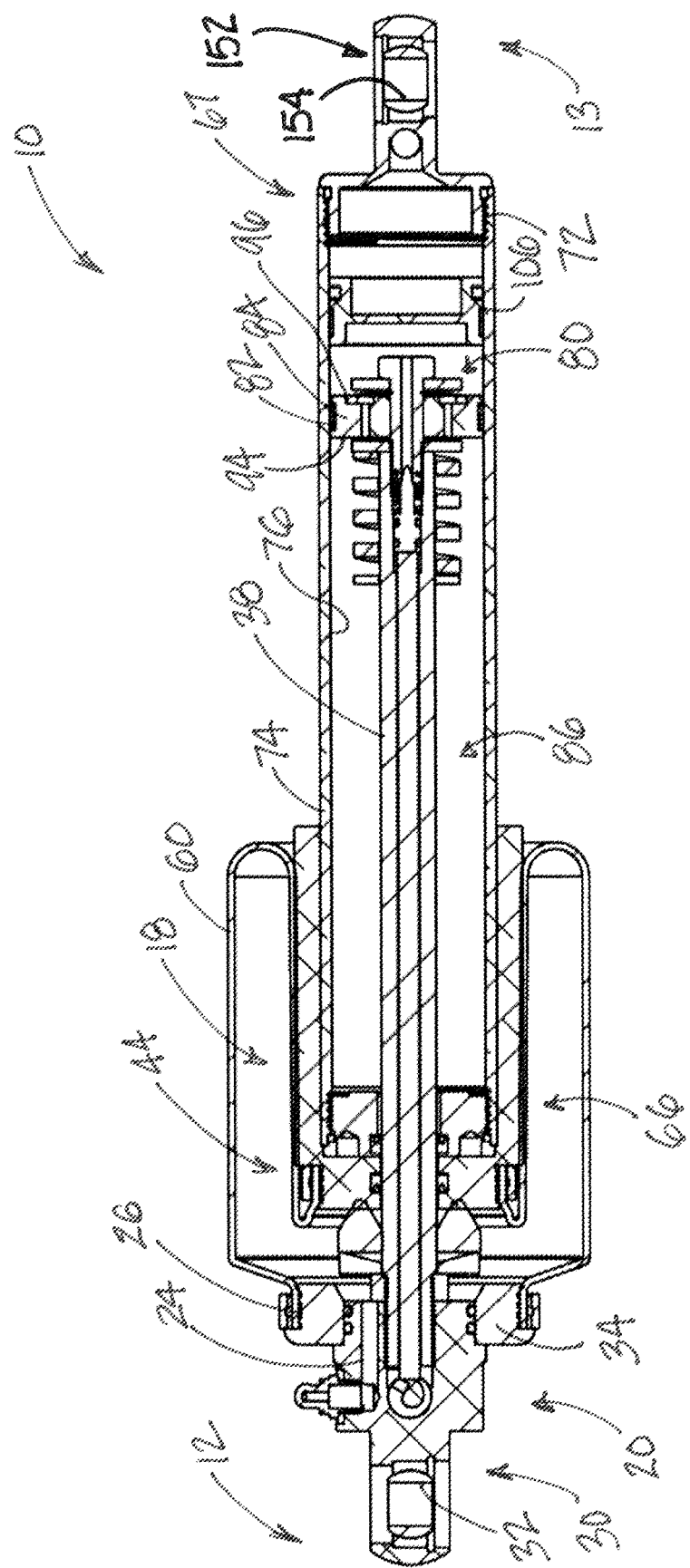
FIG. 2A is a schematic side sectional view of the suspension component shown in a relatively collapsed condition, according to an illustrative embodiment.
Figure 2B:
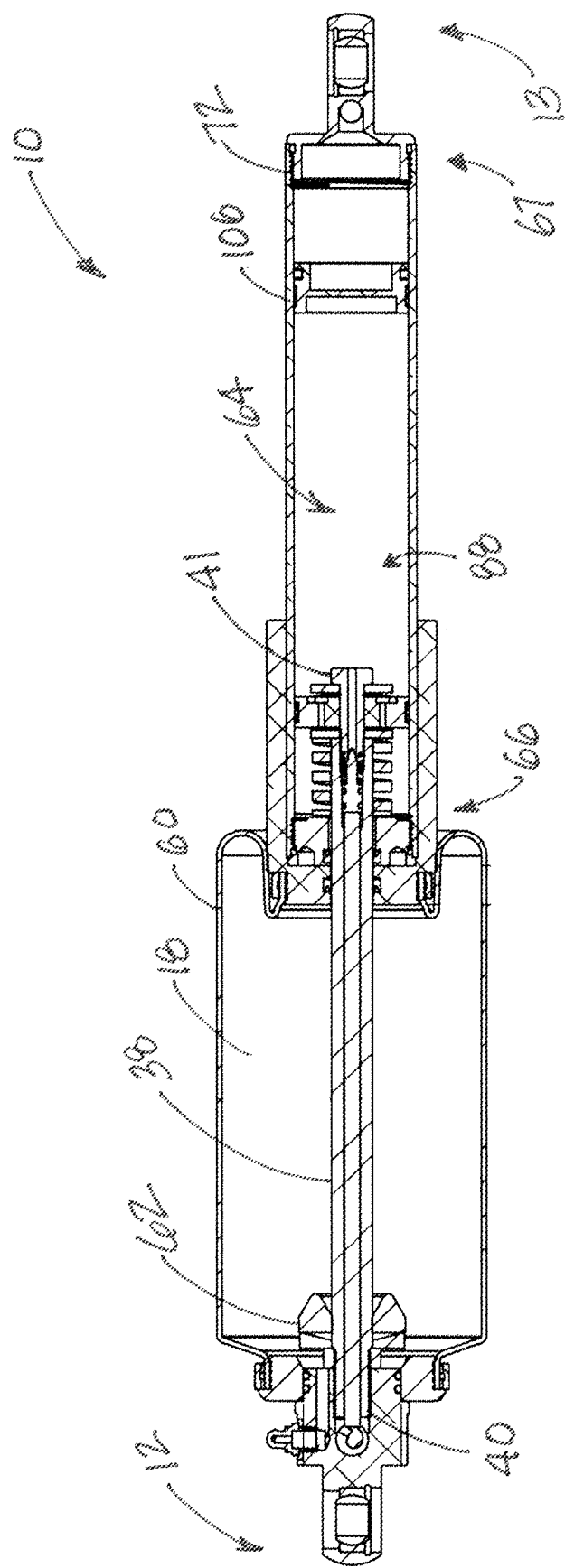
FIG. 2B is a schematic side sectional view of the suspension component shown in a relatively extended condition, according to an illustrative embodiment.
Figure 3:
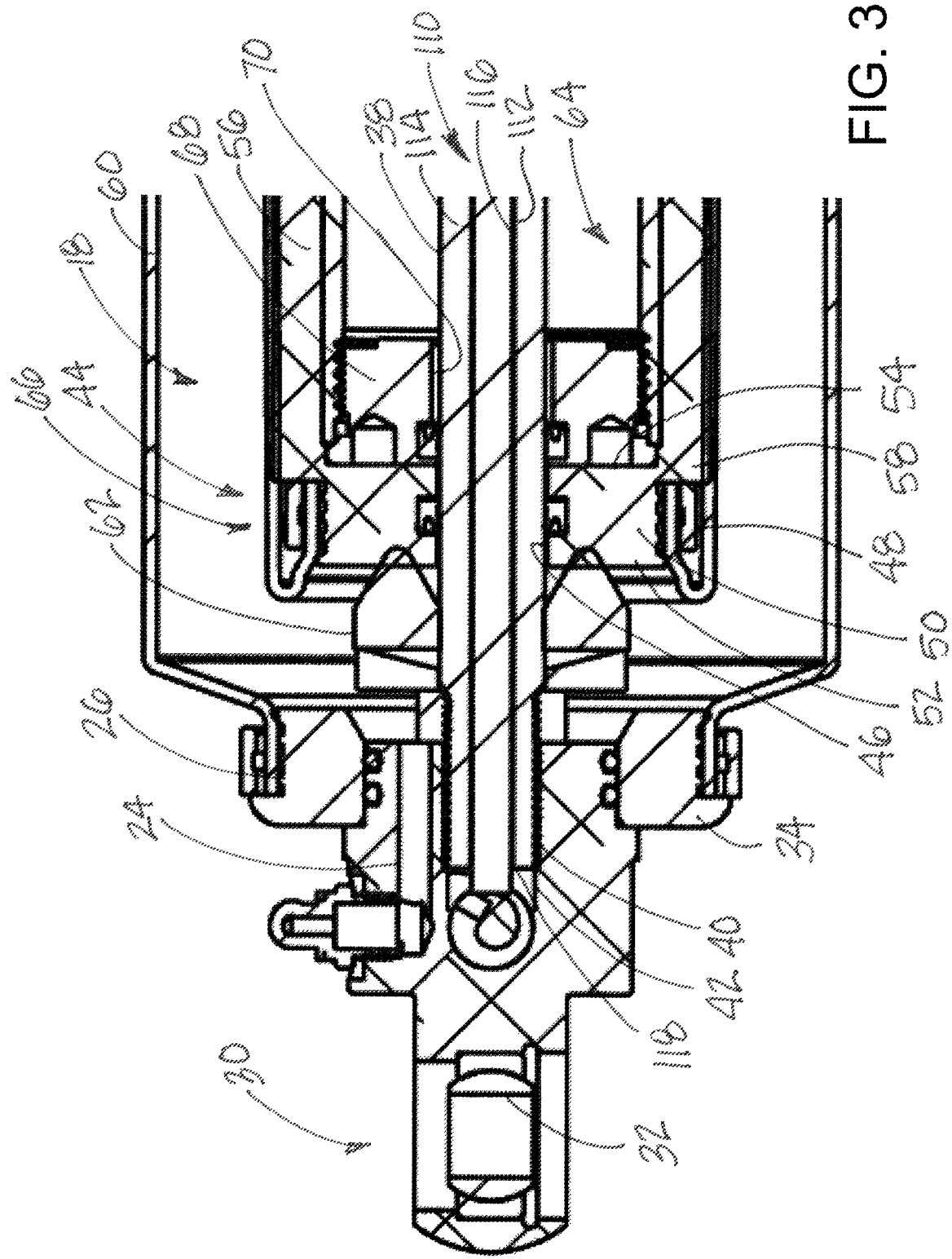
FIG. 3 is a schematic side sectional view of an end portion of the suspension component in a relatively collapsed condition and enlarged to show detail, according to an illustrative embodiment.
Figure 4:
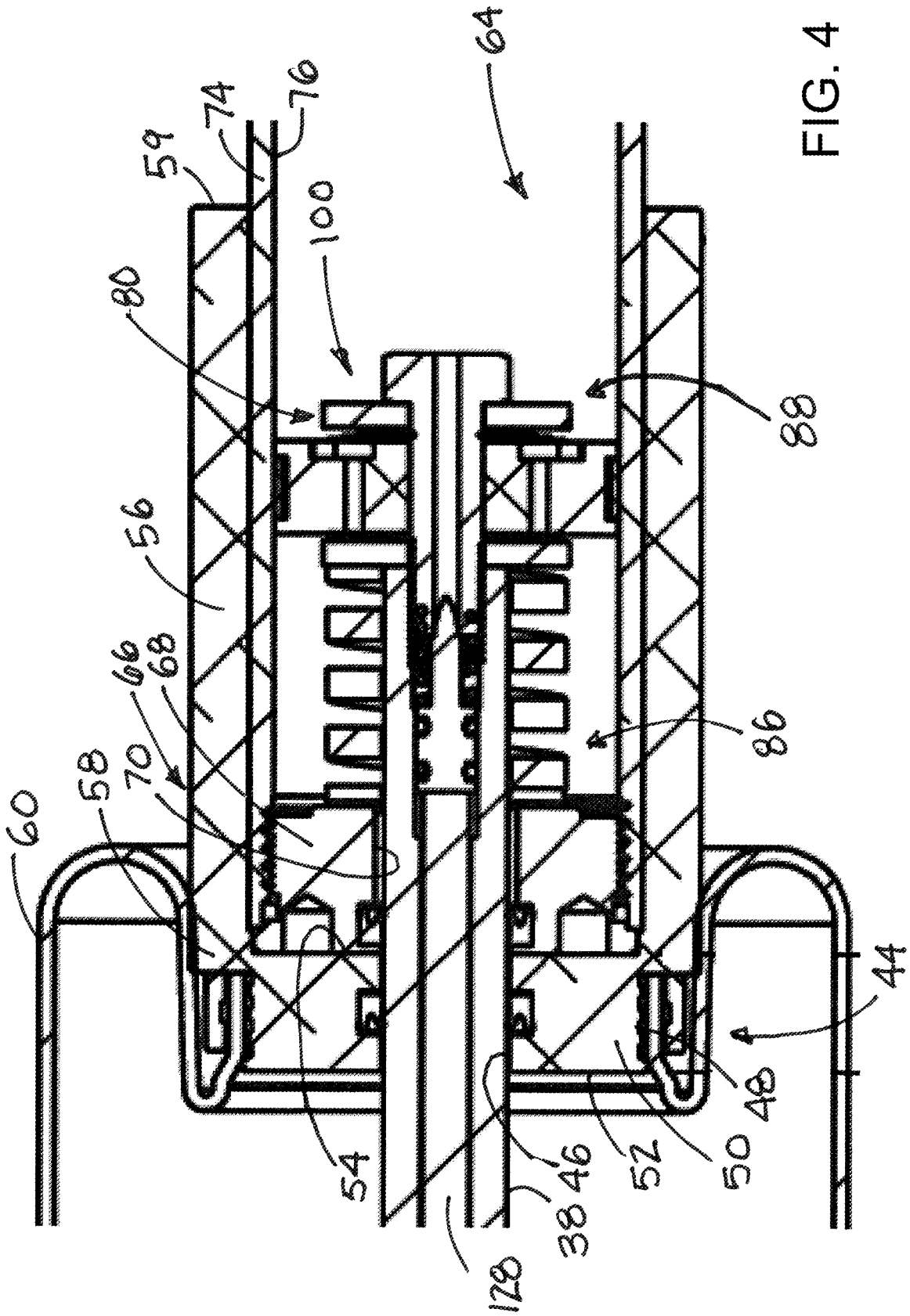
FIG. 4 is a schematic side sectional view of a medial portion of the suspension component in a relatively extended condition and enlarged to show detail, according to an illustrative embodiment.
Figure 5:
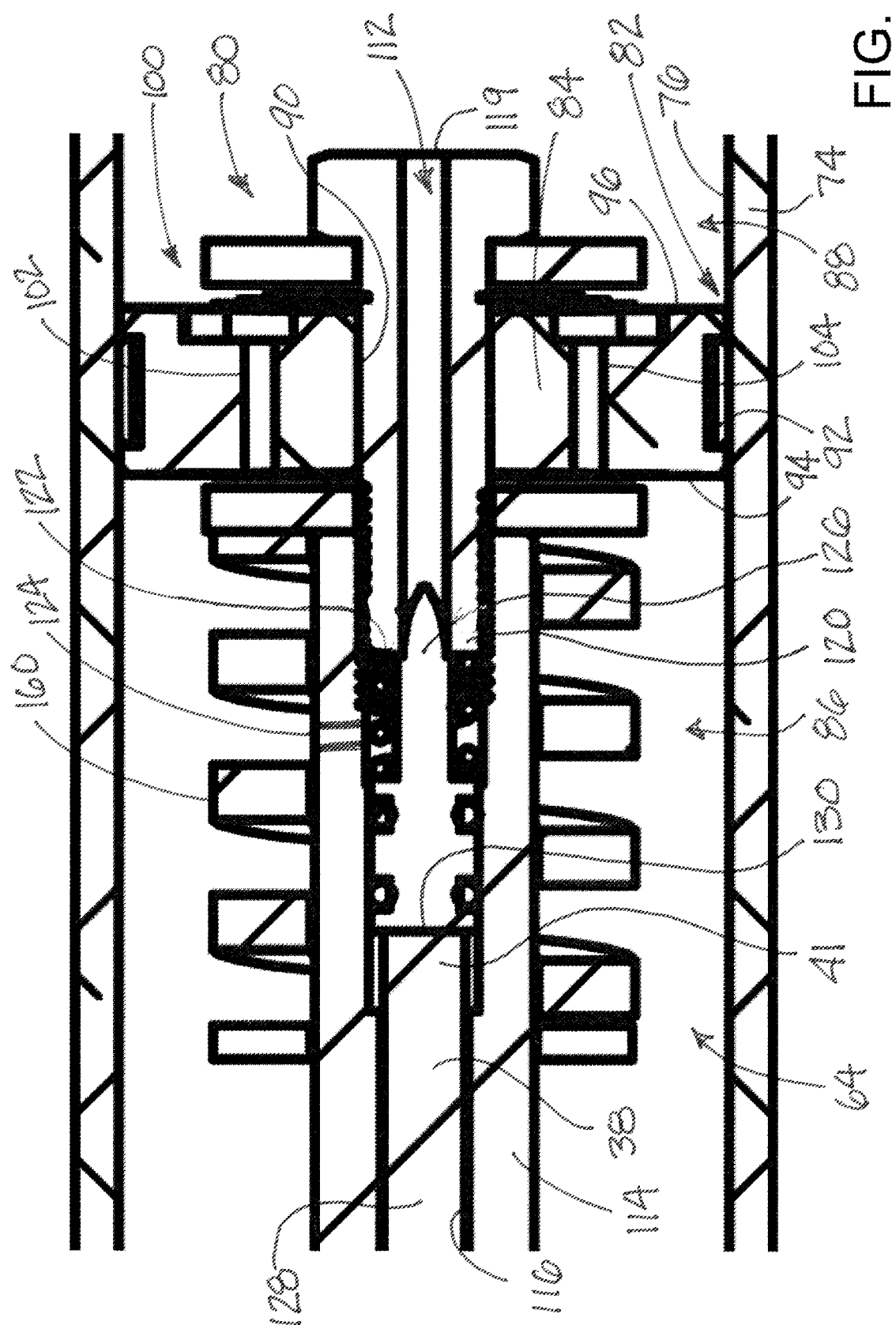
FIG. 5 is a schematic side sectional view of another portion of the suspension component enlarged to show detail, according to an illustrative embodiment.
Figure 6:
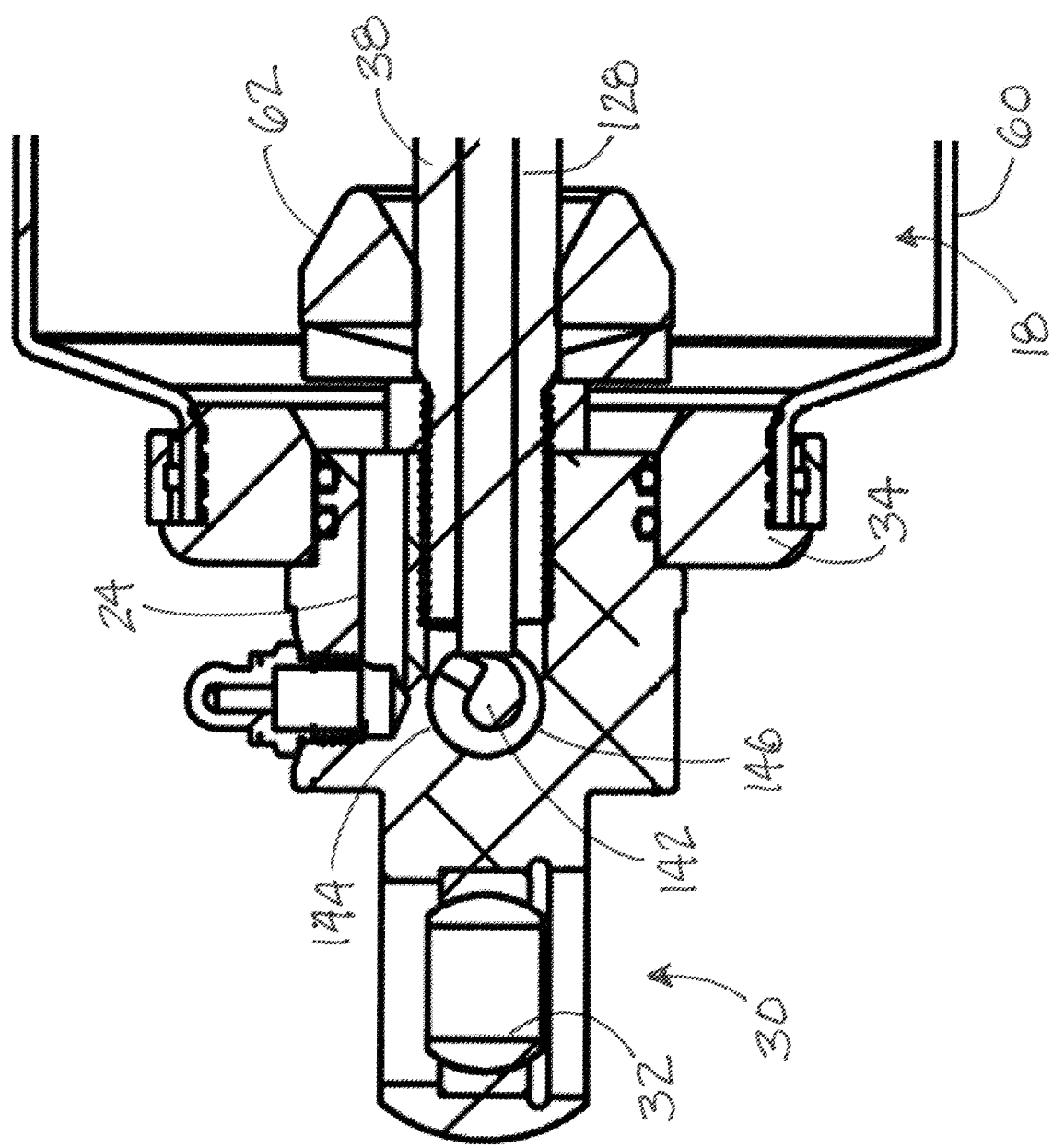
FIG. 6 is a schematic side sectional view of an end portion of the suspension component in a relatively extended condition and enlarged to show detail, according to an illustrative embodiment.

With reference now to the drawings, and in particular to FIGS. 1 through 10 thereof, a new suspension component for utility vehicles embodying the principles and concepts of the disclosed subject matter will be described.

Small recreational vehicles designed for primarily off-highway use, such as all terrain vehicles (ATVs) and utility terrain vehicles (UTVs) or "side-by-side" vehicles, have three, four or more wheels have been used for increasing number of tasks in addition to pure recreation. As a consequence, the vehicles have grown increasingly larger not only in the number of people able to be carried by the vehicles, but also by the cargo able to be transported on the vehicles. This is especially true in the case of the UTVs and side-by-sides, which often include a small (or not so small) cargo bed to increase the hauling capability of the vehicle beyond the weight of simply adding a passenger. Of course, the increased hauling capacity for such vehicles produces a wider range of weight variation that may need to be supported by the suspension of the vehicle, since the weight added to the vehicle by a single passenger is significantly lower than the weight added to the vehicle by multiple passengers and cargo.

The applicants have recognized that in view of the potential wide range of weight from passengers and cargo that may need to be supported by the suspension of such vehicles, maximum flexibility and adjustability of the suspension is desirable. Varying load conditions can require varying levels of support to be provided by the suspension as well as varying levels of damping on the movement of the suspension.

The applicants have devised a suspension component that provides adjustable levels of support as well is adjustable levels of shock absorption or damping which can be adjusted in a relatively simple manner. The suspension component 10 of the disclosure is especially suitable for off-highway or off-road vehicles having multiple person carrying capability and/or cargo carrying capability which affect the weight of the vehicle that is being suspended on the elements of the vehicle suspension such as the suspension component.

In some aspects, the disclosure relates to a system 1 which includes a vehicle 2 such as those mentioned in this disclosure, although application of the system is not necessarily limited to those types of vehicles and may include, for example, vehicles such as automobiles and pickup trucks. The vehicle 2 may comprise a frame 3 and at least one axle 4 typically with wheels 5 located on opposite ends of the axle. Typically, although not necessarily, the vehicle 2 will have a pair of axles and the wheels associated with a pair of axles. While in some applications the axle 4 may rotate in a rigid tube extending outwardly from a differential to the wheels located on opposite sides of the vehicle 2, more commonly the axle 4 may comprise a pair of axle segments or half shafts extending from the differential to the wheels without a rigid tube constraining movement of the wheels, thus allowing more independent movement of the wheel and its associated suspension structure. The vehicle 2 may also include an upper suspension mount 6 which may be located on the frame 3, or on an extension of the frame. The vehicle 2 may further include a lower suspension mount 7 located on a structure associated with the axle, for example, the rigid tube housing the axle or a suspension element supporting the axle segment, such as a lower suspension control arm connected to a suspension or steering knuckle. Often a pair of the upper suspension mounts 6 and a pair of the lower suspension mounts 7 will be associated with each axle of the vehicle.

The system 1 may also include a suspension component 10, either alone or in combination with the vehicle 2, which is configured to support the frame 3 of the vehicle on the axle 4 of the vehicle. The component 10 may be mounted on the frame 3 and the axle 4 via, for example, the upper suspension element 6 on the frame and the lower suspension element 7 on the axle. Typically, a pair of the suspension components 10 may be utilized on each axle of the vehicle, although more or less than two components 10 per axle may be utilized. The suspension element 10 may be elongated with a first end 12 and the second end 13, and the ends 12, 13 may be individually mounted on mounts 6, 7. In some applications, the component 10 may be positioned in a generally vertical orientation with the first end 12 being positioned relatively higher than the second end 13.

In general, the suspension component 10 may include a spring section 14 which performs a support function for supporting a portion of the vehicle, and a shock absorbing section 16 which performs a damping function to dampen action of the spring section. The spring section 14 may be adjustable to provide adjustable support characteristics, and the shock absorbing section 16 may be adjustable to provide adjustable damping characteristics.

The spring section 14 of the suspension component 10 may define a gas chamber, such as an air chamber 18, for holding a quantity of a gas, such as air, to provide a spring support for at least a portion of the vehicle 2. It will be appreciated by those skilled in the art that the term "spring" is being used in its functional sense, and does not necessarily describe the particular physical structure of the spring section.

In greater detail, the spring section 14 of the component 10 may include a first structure 20 which is located at the first end 12 of the component, and the first structure may form a first mounting structure 22 for mounting the first end of the component 10 to one of the mounts 6, 7 of the vehicle 2. The first structure 20 may define a portion of a boundary of the air chamber 18, and a passage 24 may extend through the first structure to permit selective passage of a fluid, such as air, through the first structure into the air chamber from outside of the component 10 in a controlled manner to control the volume of air in the air chamber and affect the spring characteristics of the spring section. The introduction of air into, and release of air out of, the passage 24 may be controlled by a valve. In some embodiments, introduction and release of air through the valve may be performed manually, utilizing, for example, a Schrader valve located at an exterior end of the passage. In some embodiments introduction and release of air through the valve may be performed automatically, utilizing, for example, an electrically-actuated solenoid valve at the end of the passage. The first structure 20 has a perimeter surface 26 which in embodiments may have a circular shape.

The first structure 20 may comprise a first connector element 30 which may serve to define the passage 24 through the structure 20. The first connector element 30 may form the first mounting structure 22, and illustratively the first mounting structure may include an aperture 32 for receiving a fastener, such as a bolt, to fasten the first connector element to one of the mounts 6, 7, such as, for example, the upper suspension mount 6 on the frame of the vehicle. The first connector element 30 may form other configurations of the first mounting structure 22, such as a post to be received in a portion of one of the mounts 6, 7. The first structure 20 may also include a first ring element 34 which is mounted on the first connector element and may form the perimeter surface 26 of the structure 20.

The spring section 14 of the component 10 may also include a connecting rod 38 which extends from the first structure 20. The connecting rod 38 may be elongated with a first end 40 and a second end 41, with the first end being mounted on the first connector element 30. Illustratively, a portion of the connecting rod adjacent to the first end 40 may be positioned in a rod channel 42 formed in the first structure 20.

The spring section 14 may also include a second structure 44 which is movable with respect to the first structure 20. The second structure 44 may be movable along the connecting rod 38 in a configuration such that the connecting rod extends between the first and second structures. The second structure 44 may define a bore 46 through which a portion of the connecting rod 38 may extend to permit the second structure to slide along the connecting rod 38. The second structure 44 may have a perimeter surface 48 located opposite of the bore 46.

In greater detail, the second structure 44 may include a second element 50 which has the bore 46 and the perimeter surface 48 thereon. The second element 50 may have a first face 52 and a second face 54 positioned on opposite sides of the element 50, and the first face 52 may be oriented toward the air chamber 18. The second structure 44 may also include a shroud 56 which may encompass a portion of the shock absorbing section 16, and may fit snugly about the portion of the shock absorbing section. The shroud 56 may have an inner end 58 and an outer end 59 with the inner end 58 being mounted on the second element 50. In some embodiments, the inner end 58 may be integral with the second element 50, such as portions of the same molded or cast part. The shroud 56 may extend from the second structure 50 in a direction away from the first structure 20, and may have a tubular configuration which may be substantially cylindrical in shape.

The spring section 14 of the component 10 may also include an air bladder 60 for forming the air chamber 18 that holds the quantity of air providing at least a portion of the spring functionality of the component 10. The air bladder 60 may form, with the first structure 20 and the second structure 44, an airbag that defines the air chamber 18. The air bladder 60 may extend between the first 20 and second 44 structures, and may be connected to each of the first and second structures to collectively form the airbag. In some embodiments, the air bladder 60 may be tubular, and may be substantially cylindrical in shape although some variation in the width of the tubular shape along the length of the bladder 60 may be present. The air bladder 60 may be secured in a suitably airtight manner to the perimeter surface 26 of the first structure and the perimeter surface 48 of the second structure.

The air bladder 60 may be formed of a material having a flexible character which flexes as the first and second structures move with respect to each other between relatively closer and relatively further apart positions, and typically result in the unfolding and folding of the material of the bladder 60 to increase and decrease the volume of the air chamber. The air bladder 60 may also be formed of material having a limited degree of elasticity which permits a limited degree of expansion of the air bladder, and thus the air chamber, in a lateral direction transverse to the length of the component 10. Thus, increases and decreases in the volume of the air chamber 18 primarily result from movement of the first 20 and second 44 structures closer and further apart, and only to a relatively small degree from circumferential expansion of the material of the air bladder. The material may include an elastomeric (e.g., a natural and/or synthetic rubber) material, and the elastomeric material may be reinforced with fibers embedded in the rubber material to enhance the strength and durability of the material as well as provide desired flexing and elasticity characteristics. Illustratively, the fibers may include aramid synthetic fibers. Layers of the fibers may be utilized in the material, and the fibers of the layers may be oriented in a longitudinal direction, in a lateral direction, or at oblique angles to produce the desired characteristics for the material of the air bladder and for the suspension component as a whole. In some embodiments, the presence of the fibers, and the manner in which the fibers are oriented, in the elastomeric material may resist or limit circumferential expansion, or expansion of the diameter, of the elastomeric material of the tube element when air is introduced into the air chamber. The ability to resist significant expansion of the diameter of the tube element 74 is particularly beneficial when the air bladder 60 is utilized with an auxiliary spring element, such as the helical spring element 164 described in this disclosure.

The spring section 14 may also include a primary bumper member 62 for cushioning impacts between the first structure 20 and the second structure 44. The primary bumper member 62 may be mounted on the connector rod 38 and may be annular so that the bumper member extends about the connecting rod 38. The bumper member 62 may be positioned adjacent to the first structure 20 at a location inside the air chamber 18.

In some embodiments, the spring section of the suspension component may include an auxiliary spring 162 in addition to the air bladder 60 which may provide suspension support in the unlikely event that air pressure is unable to be maintained in the air bladder. Further, the auxiliary spring 162 may provide a base height level for the suspension element, and the introduction of air into the air bladder 60 may provide a degree of adjustability of the height of the suspension element, as well as providing a ride quality with less harshness than may be provided by the auxiliary spring. Illustratively, the auxiliary spring 162 may take the form of a helical spring element 164 which may comprise a helically-wound metal bar (see. e.g., FIGS. 7A, 7B, 7C, and 7D) acting as a compression spring. In some embodiments, the auxiliary spring 162 may have a linear rate spring rate (see, e.g., FIGS. 7A and 7B) or a progressive rate spring (see, e.g., FIGS. 7C and 7D). The helical spring element 164 may surround the air bladder 60 of the spring section, a spatial relationship which may be facilitated by the circumferential and/or diameter size stability of the air bladder to permit spring movement by the auxiliary spring and the air bladder without interference between the spring 162 and the bladder 60. The helical spring element 164 may extend between the first end 12 and the second end 13 of the component 10, and illustratively the longitudinal ends of the helical spring element may be mounted on the first structure 20 and an element of the shock absorbing section 16. In some embodiments, one end of the helical spring element 164 may be positioned against an enlarged annular shoulder 166 formed on the first structure 20 of the component 10 and also against an abutment ring 168 mounted on the tube element 74 of the shock absorbing section 16. The position of the abutment ring 168 on the tube element 74 may be adjustable to permit adjustment of the compressive force preloaded on the spring. Illustratively, the abutment ring 168 may be threadedly mounted on the tube element 74 such that rotation of the abutment ring with respect to the tube element adjusts the compressive preload on the spring 162. Rotation of the ring 168 in one direction may tend to increase the preloaded compressive force on the helical spring element 164 (and may increase the effective spring rate and load carrying capacity of the element 10), and rotation of the ring 168 in the opposite direction may tend to relax the preloaded compressive force on the helical spring element (and may decrease the effective spring rate and load carrying capacity while improving the ride quality).

Figure 8A:
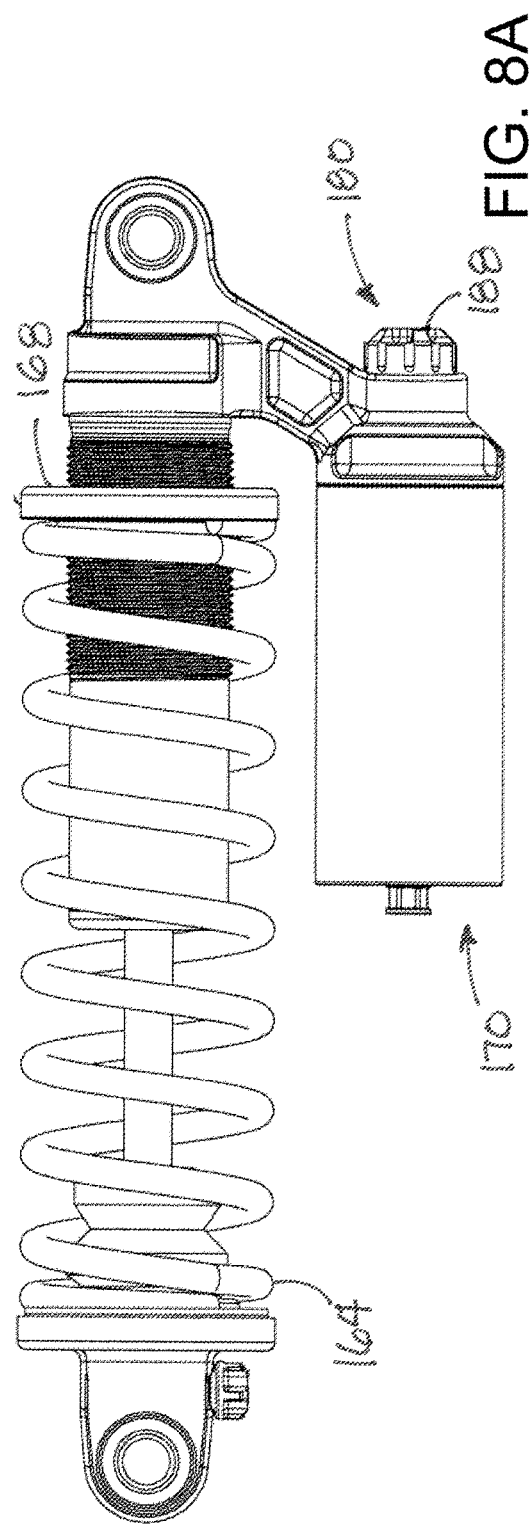
FIG. 8A is a schematic side view of a suspension element with an optional configuration for the shock absorbing section of the suspension element.
Figure 8B:
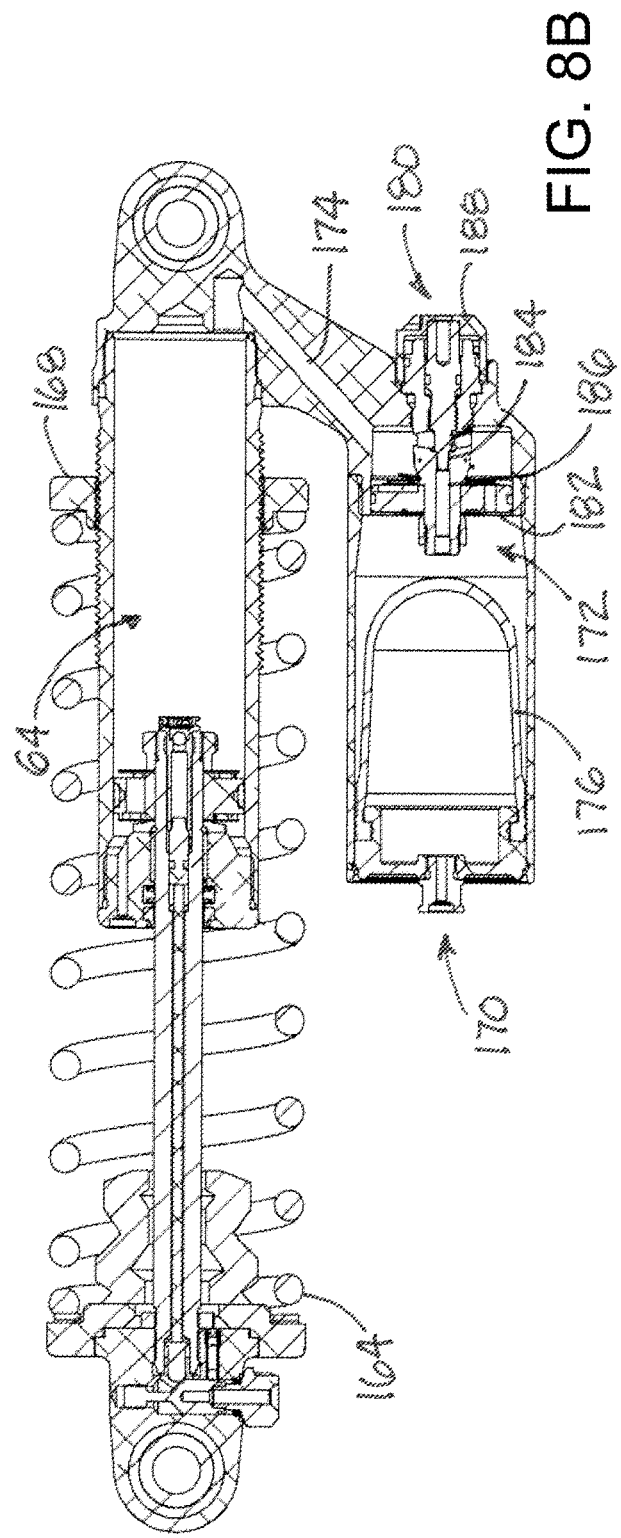
FIG. 8B is a schematic side sectional view of the suspension element with the optional shock absorbing section configuration shown in FIG. 8A.
Figure 9:
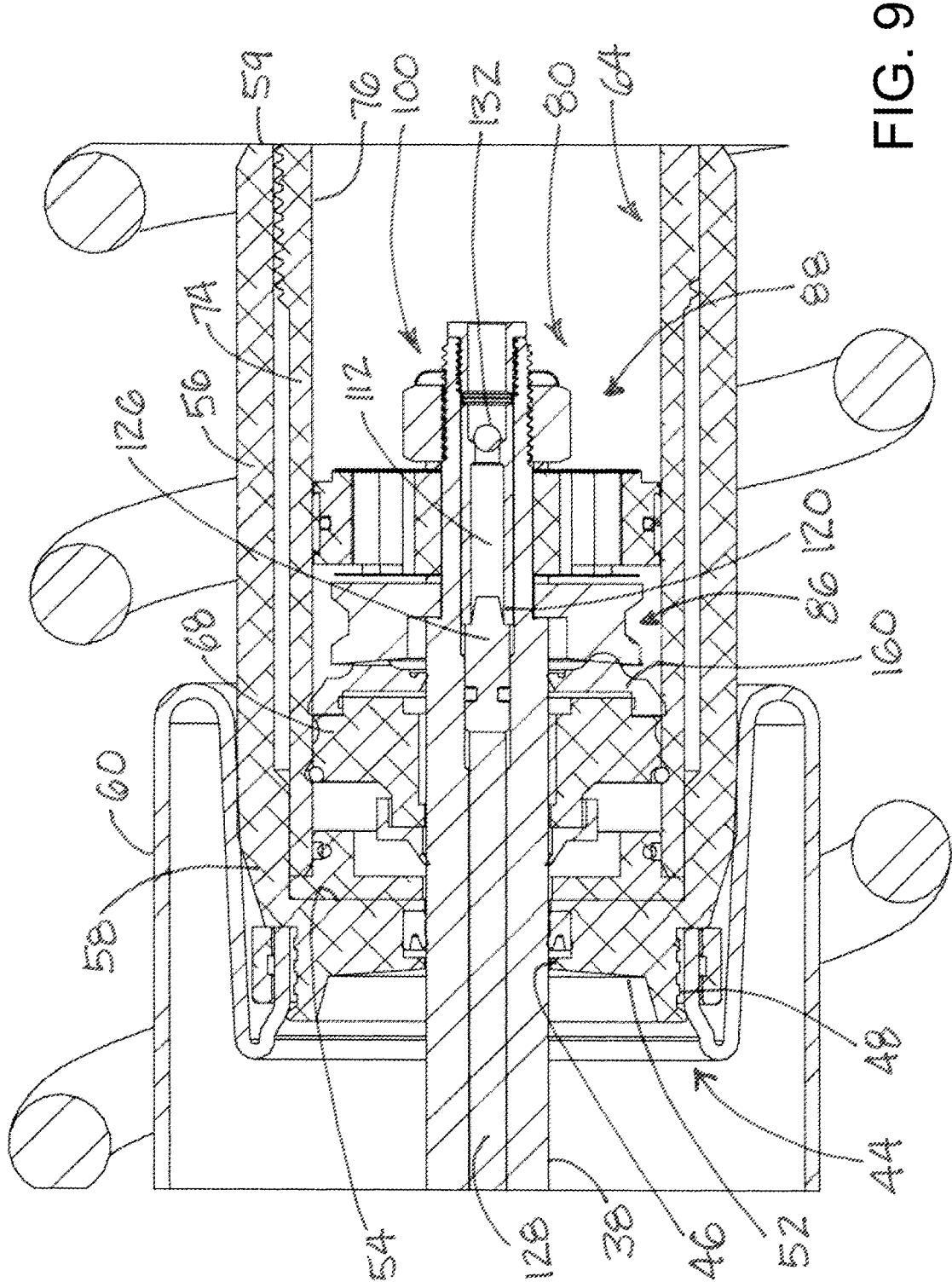
FIG. 9 is a schematic side sectional view of a medial portion of the embodiment of the suspension component shown in FIG. 8B.
Figure 10:
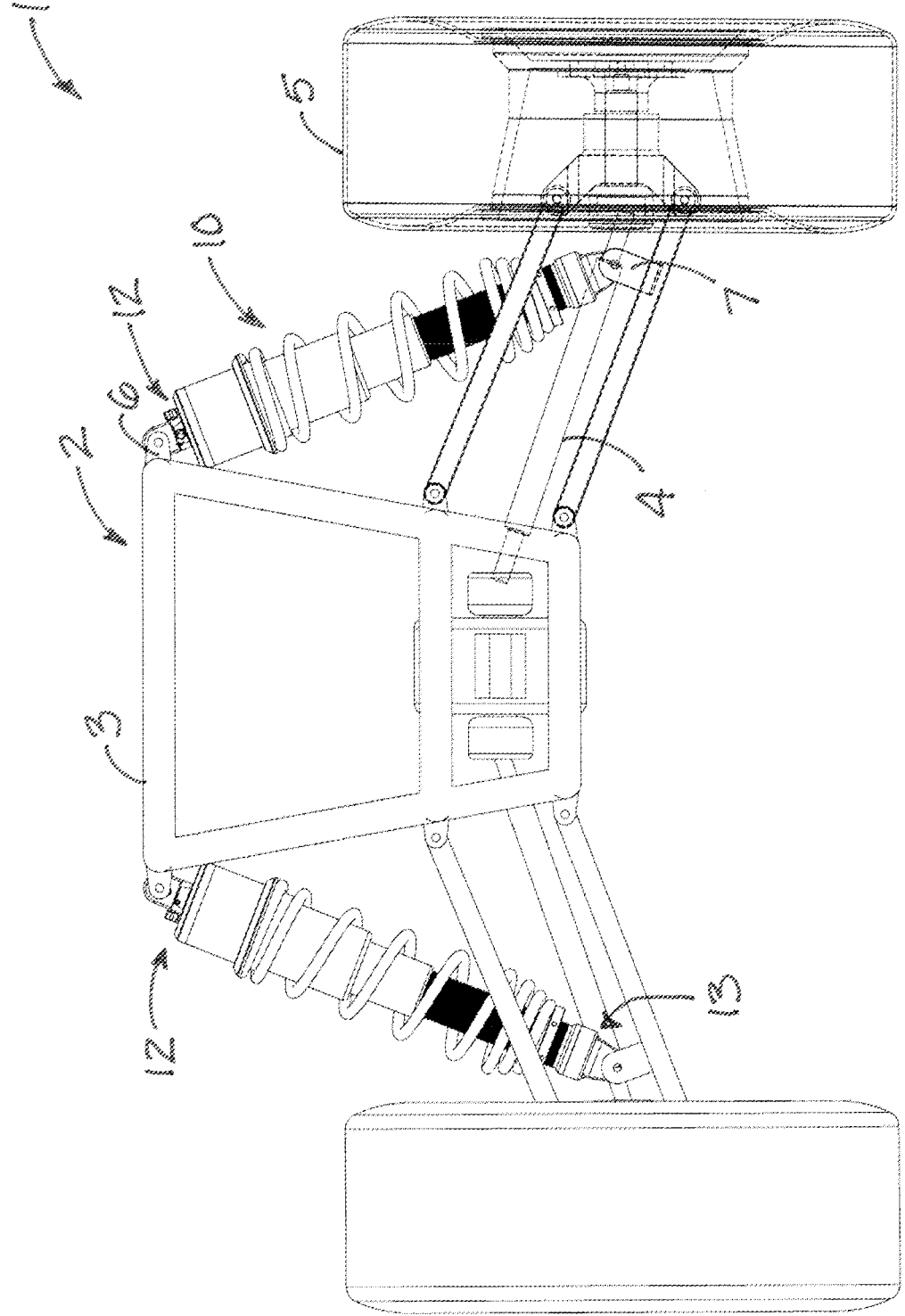
FIG. 10 is a schematic front view of a portion of a system incorporating the suspension component, according to an illustrative embodiment.

As a further option, as illustratively shown in FIGS. 8A and 8B, embodiments of the suspension component 10 utilizing the helical spring element 64 may omit elements of the spring section of the component 10 such as, for example, elements utilized to form the air chamber 18 of the spring section 14.

The shock absorbing section 16 of the suspension component 10 may define a fluid chamber 64 for holding a quantity of fluid. The shock absorbing section 16 may be elongated with a first end 66 and a second end 67, and may include a first end element 68 located toward the first end of the section 16. the first end element 68 may be mounted on the second structure 44 and may be positioned adjacent to the second face 54 of structure 44. The first end element 68 may be mounted to the second structure 44, and may be annular to define a bore 70 through which the connecting rod 38 extends. The shock absorbing section 16 may also include a second end element 72 located toward the second end 67 of the section 16. The second end element 72 may be positioned in opposition to the first end element 68, and the fluid chamber 64 may be located between the first and second end elements. A tube element 74 may extend between the first 68 and second 72 end elements of the shock absorbing section 16, and may connect the first and second end elements together to form the fluid chamber. The tube element 74 may be tubular and may have opposite end openings closed by the first and second end elements. The tube element 74 may have an inner surface 76 which faces the fluid chamber 64.

The shock absorbing section 16 may also include a piston assembly 80 which is positioned in the fluid chamber 64 and may be mounted on the connecting rod 38 such that the assembly 80 moves with the rod 38. Illustratively, the piston assembly 80 may be mounted on the portion of the rod 38 positioned in the fluid chamber, while a portion of the connecting rod 38 adjacent to the first end 40 is positioned in the air chamber 18. The piston assembly 80 may have a perimeter 82 which contacts the inner surface 76 of the tube element in a substantially fluid tight relationship.

The piston assembly 80 may include a piston disk 84 which is mounted on the connecting rod 38. The piston disk 84 functions to subdivide the fluid chamber 64 into a first fluid subchamber 86 located between the piston disk 84 and the first end element 68, and a second fluid subchamber 88 located between the piston disk and the second end element 72. The piston disk 84 may have an aperture 90 through which a portion of the connecting rod 38 adjacent to the second end 41 extends to mount the disk on the rod 38. The piston disk 84 may have a peripheral surface 92 located along the perimeter 82 of the assembly 80 for contacting the inner surface 76 of the tube element in a fluid tight manner. The piston disk 84 may have a first side 94 and a second side 96, with the first side being oriented toward the first end element 68 and the second side being oriented toward the second end element 72.

The piston assembly 80 may also include a fixed valve structure 100 which is configured to control fluid flow past the piston disk between the first 86 and second 88 fluid subchamber formed by the presence of the disk 84 in the fluid chamber 64. The fixed valve structure 100 may be configured to control fluid flow between the first and second subchambers through the piston disk during extension and contraction of the component 10. The fixed valve structure 100 may include at least one valve passage 102 extending through the piston disk, such as between the first side 94 and the second side 96 of the disk, and may include a plurality of valve passages 102, 104 formed in the disk.

The component 10 may also include a separator 106 which is configured to separate the second fluid subchamber 88 into two further or secondary subchambers located on opposite sides of the separator 106. Examples of the utilization of the separator 106 may illustratively be seen in FIGS. 7B, 7D, and 8D). A first one of the two secondary subchambers may be located between the separator 106 and the piston disk 84 and contain a liquid fluid, and a second one of the two secondary subchambers may be located between the separator 106 and the second end element 72 and contain a gaseous fluid. The separator 106 separates the liquid fluid and the gaseous fluid from the intermixing, and may be generally located between the piston disk 84 and the second end element 72. The separator 106 may be movable in the fluid chamber 64 of the shock absorbing section 16 in order to allow the gaseous fluid in the second one of the secondary subchambers to compress and expand based upon movement of the separator when acted upon by the liquid fluid in the first one of the secondary subchambers. In contrast to the piston disk 84, the separator 106 is configured so that fluid does not move through the separator between the two secondary subchambers.

The suspension component 10 may also include an adjustable valve structure 110 which is configured to provide a secondary fluid path through the piston assembly. The secondary fluid path may have a size that is variable or adjustable to vary or adjust the rate at which fluid is able to move between the first fluid subchamber 86 and the second fluid subchamber 88 in the fluid chamber 64 along the secondary fluid path and independent of any passages of the piston assembly 80. The adjustable valve structure 110 may include a channel 112 which is formed in the connecting rod 38 and extend longitudinally between the ends 40, 41 of the rod 38. The connecting rod 38 may include a perimeter wall 114 with an inner surface 116 defining the channel 112. The channel 112 may have a first opening 118 located at the first end 40 of the connecting rod and a second opening 119 at the second end 41 of the connecting rod. The channel 112 may define a valve seat 120, which may be formed by a shoulder 122 located on the inner surface 116 of the perimeter wall of the rod 38. The shoulder 122 may be located toward the second end 41 of the rod 38. At least one channel hole 124 may extend through the perimeter wall 114 of the rod 38 such that it extends between the inner surface 116 and an outer surface of the connecting rod. The channel hole 124 may be located on the connecting rod 38 at a location between the shoulder 122 and the first end 40 of the rod 38.

The adjustable valve structure 110 may also include a valve needle element 126 which is positioned in the channel 112 proximate to the valve seat 120. The valve seat element 126 may be movable toward and away from the valve seat to adjust the size of the fluid path of the adjustable valve structure, and may be slidably movable in the channel 112. The valve needle element 126 may have a tapering end portion 132 that tapers smaller in size toward the valve seat such that the end portion 132 is able to be partially insertable into the valve seat. The valve needle element 126 may form a seal with inner surface 116 of the channel to prevent movement of fluid past the needle element and into portions of the channel toward the first opening 118 at the first end 40 of the rod 38. A check valve 132 may be in communication with the channel 112 to resist or prevent fluid movement through the channel (see FIG. 9). In some embodiments, the check valve 132 may be configured to resist movement of fluid through the channel 112 from the second fluid subchamber 88 to the first fluid subchamber 86, such as during compression movement of the components of the suspension element 10, while not presenting significant resistance to fluid movement through the channel 112 during extension or rebound movement of the components of the element 10. In such configurations including the check valve 132, the adjustable valve structure 110 may influence the movement of fluid between the first 86 and second 88 fluid subchambers during rebound movement of the suspension element 10 (e.g., when valve 132 does not resist fluid movement through the channel 112), while having minimal or no influence on the movement of fluid between the subchambers 86, 88 during compression movement of the element 10 (e.g., when valve 132 resist movement through the channel 112).

The adjustable valve structure 110 may also include an adjustment rod 128 which is configured to adjust flow of fluid through the adjustable valve structure by adjustably controlling fluid flow through the valve seat 120 and out of the channel hole of holes 124 of the connecting rod. The adjustment rod 120 may be slidably movable in the channel 112 of the connecting rod to adjust a proximity of the adjustment rod 128 to the valve seat 120. The adjustment rod 128 may have a needle end 130 for positioning proximate to the valve needle element 126 so as to be able to move the valve needle element with respect to the valve seat 120. The adjustment rod 128 may also have an actuation end 134 located opposite of the needle end 130, and the actuation end may be positioned in the first connector element 30 of the first structure 20. The adjustable valve structure 110 may also include a valve adjustment actuator 140 which is configured to adjust the position of the adjustment rod 128 in the channel 112 of the connecting rod with respect to the valve seat 120. The valve adjustment actuator 140 may include a valve adjustment shaft 142 which is positioned in a shaft channel 144 located in the first structure 20. The shaft channel 144 may be in communication with the rod channel 42 in the first structure 20. The valve adjustment shaft 142 may have an abutment portion which is configured to contact the actuation end 134 of the adjustment rod. The abutment portion may have an outer surface 146 which is able to rotate eccentrically with respect to an axis of rotation of the shaft 142 such that the abutment with the actuation end of the adjustment rod varies as the valve adjustment shaft is rotated. The valve adjustment actuator 140 may also include a valve adjustment knob 148 which is mounted on the valve adjustment shaft 142 to permit rotation of the knob by, for example, the fingers of the user, the fingers of the user and thereby cause rotation of the shaft. The valve adjustment shaft 142 may be infinitely adjustable, or by adjustable between discrete adjustment positons of the adjustment rod.

Optionally, the volume space of the fluid chamber 64 of the shock absorbing section 16 may be effectively extended or reconfigured by utilizing an auxiliary chamber structure 170 (see e.g., FIGS. 8A and 8B) which defines an auxiliary fluid chamber 172 which is in fluid communication with the primary fluid chamber 64. The auxiliary chamber structure 170 may be positioned alongside or adjacent to the extent of the shock absorbing section 16 in what may be characterized as a "piggyback" arrangement. The utilization of the auxiliary chamber structure 170 may permit a relatively larger combined space for the fluid chambers wall accommodating vehicle frame and suspension designs which provide limited space for suspension component such as the suspension element 10. The auxiliary chamber structure 170 may define a fluid pathway 174 that extends between, and is in fluid communication with, the primary fluid chamber 64 and the auxiliary fluid chamber 174. Optionally, a gaseous fluid may be positioned in the auxiliary fluid chamber 170 as well as a liquid fluid, and in some embodiments a flexible bladder or sac 176 may hold the gaseous fluid and separate it from the liquid fluid (see, e.g., FIG. 8B). In some embodiments, a gaseous fluid fill 178 may be positioned on the auxiliary chamber structure 172 to permit gaseous fluid to be added to or removed from the auxiliary fluid chamber, such as in the sac 176 or the space adjacent to the separator 106. It should be recognized that while the description of this disclosure regards an auxiliary chamber structure which is incorporated with other components of the suspension element 10, an auxiliary chamber structure may be located relatively remotely from the other components of the element 10 with a conduit providing communication between the fluid chamber 64 and the auxiliary fluid chamber of the remotely located auxiliary chamber structure.

The shock absorbing section 16 of the suspension component 10 may also include a second connector element 150 which is located at the second end 13 of the component 10, and the second end 67 of the shock absorbing section. The second connector element 150 may be mounted on the second end element 72 of the shock absorbing section 16. The second connector element 150 may form a second mounting structure 152, and illustratively may have an aperture 154 for receiving a fastener to fasten the second end of the component to one of the mounts 6, 7, such as the lower suspension mount.

The shock absorbing section 16 may also include a cushioning element 160 which is positioned adjacent to the piston assembly 84 for cushioning impact, or preventing impact, between the piston disk 84 and the first end element 68 upon extension of the component 10. The cushioning element 160 may be positioned about the connecting rod 38, and illustratively may comprise a compression spring which may be helical in shape, although other suitable cushioning elements may also be utilized.

Additional adjustable valving 180 may be provided on the suspension element to adjustably restrict movement of fluid, such as liquid fluid, during compression movement of the components of the suspension element 10. The adjustable valving 180 may influence the movement of fluid in the fluid chamber 64 of the shock absorbing section 16 (e.g., between the subchambers of chamber 64 as illustratively depicted in the embodiments of FIGS. 7A and 7B), or between the fluid chamber 64 and the auxiliary fluid chamber 172 (as illustratively depicted in the embodiments of FIGS. 8A through 8D). The adjustable valving 180 may be independent of valves associated with the piston assembly 80 and the adjustable valve structure 110. In some embodiments, a bulkhead 182 may be positioned in the fluid chamber 64 and may be mounted in a manner that resists movement of the bulkhead in the chamber 64. The bulkhead 182 may further divide the fluid chamber 64 into subchambers in addition to the other subchambers, such as the subchambers 86, 88 defined by the presence of the piston assembly 80 and the subchambers created by the presence of the separator 106 in the fluid chamber. In embodiments, the bulkhead 182 may be positioned in the primary portion of the fluid chamber (see, e.g., FIGS. 7A and 7B) while in other embodiments, the bulkhead 182 may be positioned in the auxiliary fluid chamber 172 (see, e.g., FIGS. 8A and 8B). Illustratively, adjustability of adjustable compression valving 180 may control or restrict the flow of fluid into the auxiliary chamber structure 172 during compression of the suspension element 10. Illustratively, the adjustable compression valving 180 may be provided by a valve needle 184 positioned in a valve passage 186 through which fluid moves between the subchambers on opposite sides of the bulkhead 182 (see FIGS.

8A and 8B), or from the primary fluid chamber 64 to the auxiliary fluid chamber 172 (see FIGS. 8C and 8D). The relative position of the valve needle 184 with respect to the valve passage 186 may be adjusted to effectively increase or decrease the size of the cross-sectional area of a portion of the passage 186 to thereby adjust the degree of restriction of fluid flow through the passage 186 by the presence of the needle 184. Illustratively, the valve needle 184 may be threadedly mounted on structure forming the passage 186 such that rotation of an adjustment knob 188 forming an extension of the valve needle 184 varies the position of the needle 184 within the passage 186 to alternatively restrict or expand the cross-sectional portion of the passage 186 at the location of the needle 184. Optionally, further control of the flow of the fluid from the primary fluid chamber 64 to the auxiliary fluid chamber 172 may be provided by a structure 190 positioned at the point of entry for the fluid into the auxiliary fluid chamber, and which may include one or more valve shims with the number of shims selected to provide the desired effect on compression damping.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A suspension component for mounting on a frame of a vehicle and an axle of the vehicle to support the frame on the axle, the suspension element being elongated between a first end and a second end, the component comprising:
    a spring section performing a support function for supporting a portion of the vehicle; and
    a shock absorbing section performing a damping function to damp action of the spring section;
    wherein the spring section is adjustable to provide adjustable support characteristics and the shock absorbing section is adjustable to provide adjustable damping characteristics, the spring section being adjustable independent of the shock absorbing section;
    wherein the spring section of the suspension component defines a gas chamber for holding a quantity of a gas to provide a spring support for the vehicle;
    wherein the shock absorbing section of the suspension component defines a fluid chamber to provide damping of movement of the spring section; and
    a helical spring surrounding portions of the exterior of the spring section and the shock absorbing section, wherein the helical spring is mounted under compression between the spring section and an abutment ring mounted on the shock absorbing section;
    wherein the position of the abutment ring on the shock absorbing section is adjustable to permit adjustment of the compressive force on the helical spring.

2. The component of claim 1 wherein the spring section of the suspension component comprises:
    a first structure located at the first end of the suspension component;
    a connecting rod extending from the first structure, the connecting rod being elongated with a first end and a second end, the first end of the connecting rod being mounted on the first structure;
    a second structure movable along the connecting rod with respect to the first structure, the second structure being movable such that the connecting rod extends between the first structure and the second structure; and
    a gas bladder for forming the gas chamber that holds a quantity of the gas, the gas bladder extending between and being connected to the first structure and the second structure to collectively define the chamber.

3. The component of claim 2 comprising a piston assembly positioned in the fluid chamber and mounted on the connecting rod wherein the shock absorber section includes an adjustable valve structure configured to provide a fluid path through the piston assembly with a variable size.

4. A suspension component for mounting on a frame of a vehicle and an axle of the vehicle to support the frame on the axle, the suspension element being elongated between a first end and a second end, the component comprising:
    a spring section performing a support function for supporting a portion of the vehicle, the spring section including:
        a. a first structure located at a first end of the component for mounting the component to the vehicle;
        b. a connecting rod extending from the first structure;
        c. a second structure which is movable along the connecting rod with respect to the first structure;
        d. wherein the first structure and the second structure collectively define a gas chamber for holding a quantity of a gas to provide a spring support for the vehicle; and wherein the quantity of gas in the gas chamber is adjustable to adjust the spring support for the vehicle;
    a shock absorbing section including:
        a. a tube element defining an elongated fluid chamber which is movable along the connecting rod, the tube element having a first end mounted to the second structure of the spring section and a second end for mounting the component to the vehicle;
        b. a piston assembly positioned in the fluid chamber and mounted to the connecting rod, wherein a perimeter of the piston assembly contacts an inner surface of the tube element in a fluid tight manner, and wherein the piston assembly moves with the connecting rod relative to the tube element;

c. wherein the shock absorbing section dampens movement of the piston assembly relative to the tube element; and a helical spring surrounding portions of the exterior of the spring section and the shock absorbing section, wherein the helical spring is mounted under compression between the first structure and an abutment ring mounted on the tube element;

wherein the position of the abutment ring on the tube element is adjustable to permit adjustment of the compressive force on the helical spring.

5. The suspension component of claim 4, comprising a gas bladder for forming the gas chamber, the gas bladder extending between and being connected to the first structure and the second structure to collectively define the gas chamber.

6. The suspension component of claim 4, comprising a bumper member positioned adjacent the first structure and extending annularly around the connecting rod.

7. The suspension component of claim 4, comprising a compression spring positioned about the connecting rod between the piston assembly and the first end of the tube element.

8. The suspension component of claim 4, comprising a shroud extending from the second structure away from the first structure wherein the shroud has a tubular configuration which fits snugly around a portion of the tube element.

9. The suspension component of claim 4, wherein the first structure defines a passage to permit selective passage of a gas into the gas chamber from outside of the component, and a valve operable to control the introduction of gas into and the release of gas out of the gas chamber via the passage.

10. The suspension component of claim 4, comprising a separator located between the piston assembly and the second end of the tube element which separates the fluid chamber into subchambers on opposite sides of the separator, wherein a subchamber between the separator and the second end of tube element contains a gaseous fluid, and a subchamber between the separator and the piston assembly contains a liquid fluid, and wherein the separator is movable in the fluid chamber to allow the gaseous fluid to compress and expand based upon movement of the separator when acted upon by the liquid fluid.

\* \* \* \* \*